Oct. 23, 1923. 1,471,940
F. W. BRIGHT
ENSILAGE FOLLOWER
Original Filed May 24, 1921  2 Sheets-Sheet 1
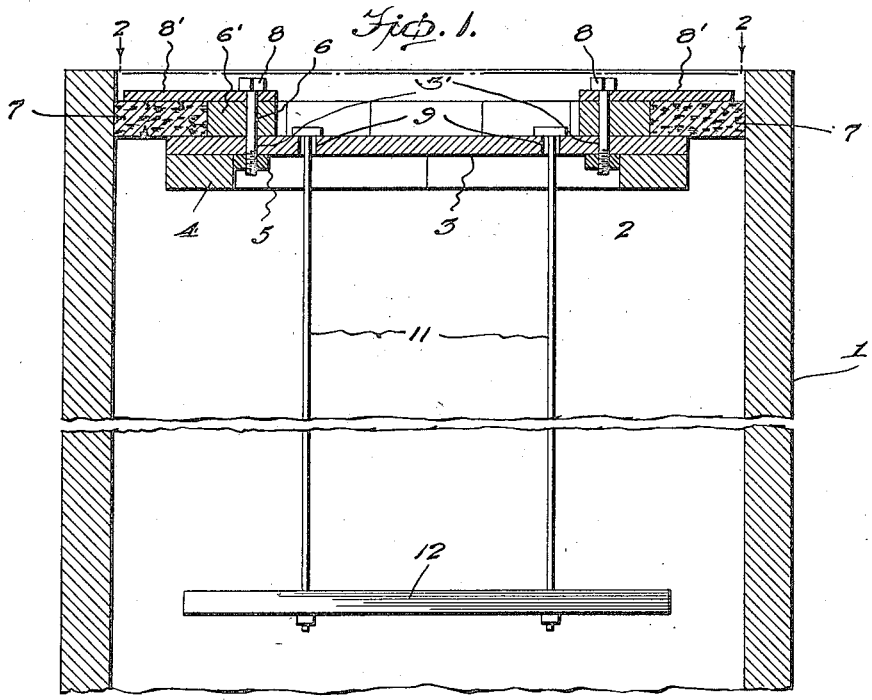
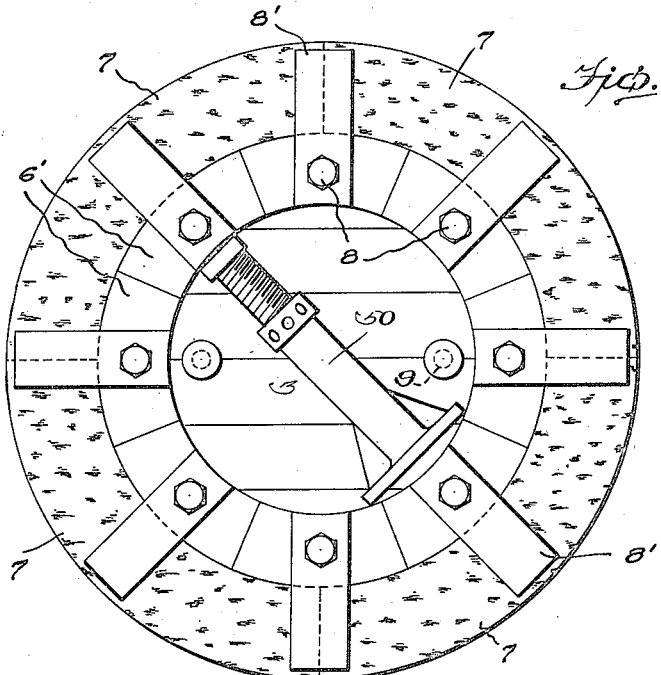
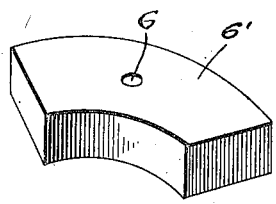
F. W. Bright
INVENTOR
BY Victor J. Evans
ATTORNEY
WITNESS:

Oct. 23, 1923.
F. W. BRIGHT
ENSILAGE FOLLOWER
Original Filed May 24, 1921    2 Sheets-Sheet 2
1,471,940
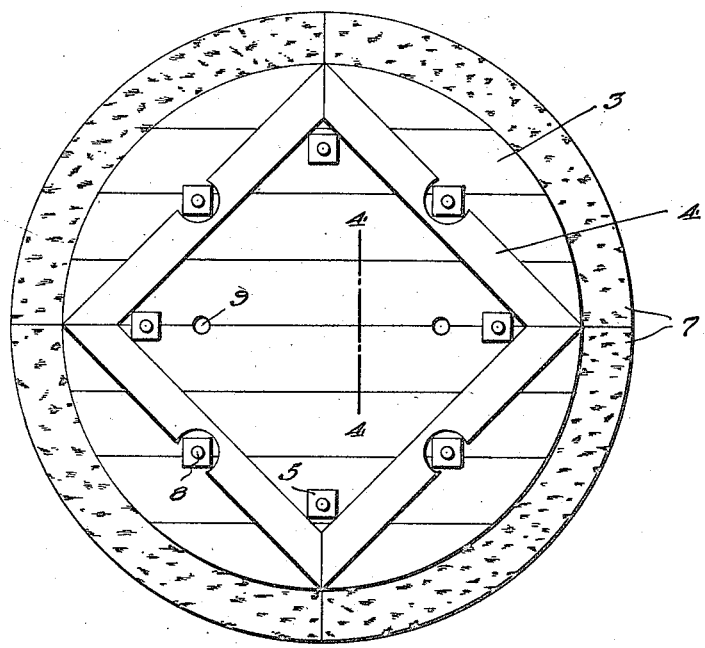
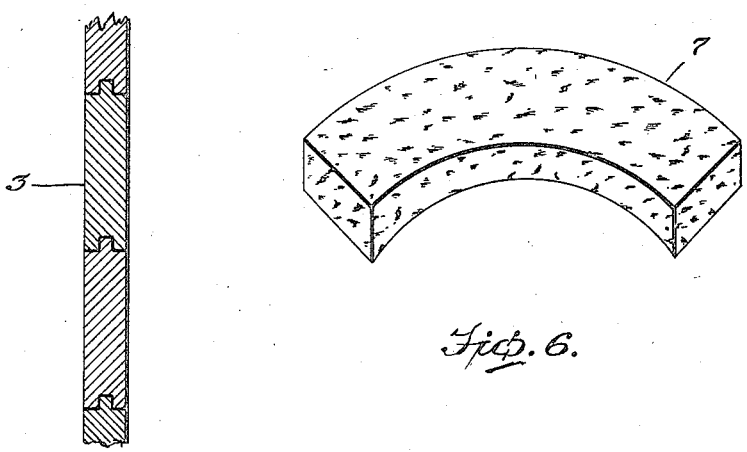
F. W. Bright
INVENTOR
BY
ATTORNEY
WITNESS:

Patented Oct. 23, 1923.

1,471,940

UNITED STATES PATENT OFFICE.

FRED W. BRIGHT, OF MURFREESBORO, TENNESSEE.

ENSILAGE FOLLOWER.

Application filed May 24, 1921, Serial No. 472,208. Renewed September 13, 1923.

*To all whom it may concern:*

Be it known that I, FRED W. BRIGHT, a citizen of the United States, residing at Murfreesboro, in the county of Rutherford and State of Tennessee, have invented new and useful Improvements in Ensilage Followers, of which the following is a specification.

From experience, I have found that ensilage in silos decays at the top of the silo when stored therein. The decayed ensilage is, of course, a total loss as no use can be made thereof and such decayedness affects the ensilage for depths of from six to twelve inches from the top so that a material loss is thus occasioned. This decay is caused by the entrance of air to the ensilage from the top of the silo, and it is the object of the present invention to produce a means in the nature of a stopper or follower for the ensilage which will rest thereover and which will contact with the walls of the silo to prevent the entrance of air to the ensilage in the silo.

It is a further object to produce an air excluding follower for the ensilage in silos which may be cheaply constructed, easily positioned, effective in its contacting engagement with the walls of the silo and which is of a weight and construction whereby the same will at all times rest on the top or level of the ensilage before or after portions of such ensilage have been removed from the silo.

It is a further object to produce a follower for ensilage in silos which comprises a stopper for the top of the silo which comprises a body member round in plan to correspond to the cross sectional contour of the silo but of a less cross sectional diameter than that of the silo, said member carrying a peripheral ring of compressible material associated with and connected to the member in a manner whereby the ring is at all times in compressing engagement with the wall of the silo.

The foregoing, and other objects which will appear as the nature of the invention is better understood, may be accomplished by a construction, combination and operative association of parts, such as is disclosed by the drawings which accompany and which form part of this application.

In the drawings:—

Figure 1 is a vertical transverse sectional view through a portion of a silo illustrating the application of the improvement.

Figure 2 is a top plan view of the improvement removed from the silo.

Figure 3 is a bottom plan view of the improvement removed from the silo.

Figure 4 is an enlarged sectional view approximately on the line 4—4 of Figure 3.

Figure 5 is a view of one of the segments constituting the solid ring that engages with the segments constituting the compressible ring.

Figure 6 is a view of one of the segments of the compressible ring.

Referring now to the drawings in detail, the numeral 1 designates a portion of a silo of the cross sectionally round construction. It will be noted, as the description progresses, that the stopper may be made to fit either round or elliptical silos, without altering the body thereof but by removing or adding sections of the compressible ring, which comprises an important element of the improvement.

The improvement is broadly indicated by the numeral 2 and comprises a body portion 3. The body may be constructed from the same material as that from which the silo is constructed, or may be in the nature of tongue and groove material. In any event, the confronting edges of the board that constitute the body are treated to a coat of heavy paint or lead so that no air will pass between the joints thereof. The boards constituting the body 3 are cut to provide the said body with a round periphery which, however, is of a less cross sectional diameter than that of the silo 1. The body is constructed in the solo, the boards comprising the same being nailed to battens 4 which are arranged angularly with respect to the seams of the body. The body 3 is provided, adjacent its periphery, with bolts openings 3'. On the top of the body 3 there are wooden segments 6' each having a bolt opening therethrough, the segments, when disposed on the body comprising a complete ring. Also resting on the upper face of the body, outward of the segments 6' are segments 7 of compressible material. These segments 7 are preferably formed of cork, and the ring provided thereby, as well as the ring provided by the members 6 are in segments or sections so as to permit of the follower being constructed on the inside of the silo. The members 7 are adapted to be forced into tight contact with the inner wall of the silo, and to accomplish this, suitable means influenced by jack screws 50 or the like are employed. When the compressible ring is brought against the wall of the silo, certain of the segments 6' are arranged against the inner periphery of the said ring, compressing the segments of the ring against the wall of the silo. The bolt openings 6 through the said segments 6' are now in register with the before mentioned bolt openings, and bolts 8 are passed therethrough and are engaged by nuts 5 on the under face of the body 3. The bolts and nuts draw the segments against the body 3. The bolts 8 also pass through openings in radially arranged plates 8', the heads of the bolts contacting with the said plates. One plate 8' is arranged over each segment 6', and certain of the plates 8' bridge the confronting ends of the segments 7.

The body 3 is provided with a pair of spaced apertures 9, the said apertures providing means whereby a wire or the like may be passed therethrough and the follower raised to the top of the silo or held in proper position when ensilage is let in the silo. When the flexible element is removed, the openings 9 are closed by suitable stoppers, so that no air will enter the silo through the follower or stopper. There may be also passed through the openings 9 flexible members 11 that have secured to their lower ends a cross bar 12. These flexible elements and cross bar may be embedded in the ensilage and will serve to more effectively move the stopper downward in the silo when the ensilage is removed therefrom.

The openings 9 not only serve to admit the flexible elements, but they also serve as an exit for the air which escapes upward as the ensilage settles. To better demonstrate this, we will suppose that a silo 30 feet high is filled and the follower is placed on it. Within about 72 hours, this ensilage will settle until it stands not over 27 feet in the silo. Now with the cross bar embedded in the ensilage and attached by the flexible member to the follower, the follower is drawn down after the ensilage, the latter being drawn by the cross bars. Since the follower excludes air from without it would also hold and prevent the escape of air in the silo. Thus, if the ensilage settles 3 feet, it pushes just that much air to the top. Now the follower cannot follow the ensilage unless this air escapes. The air does escape through the openings 9, but while the ensilage is settling, no air goes into the silo through these openings, because there is a greater pressure without. As soon as settling is completed, the flexible members and cross bars have served their purpose and may be removed so that stoppers may be placed in the openings 9.

It is obvious that were the ensilage to stand at a constant height and the apertures thereto shut, there would be no spoiling of the ensilage, but when it is desired to begin withdrawing the ensilage, the stopper is suspended at the top of the silo or other place. So long as the ensilage is being removed, from the silo to a depth of say 2 inches daily there will be no spoiling, so that no protection is needed except when no ensilage is being removed. If, for any reason, ensilage should cease being removed, the follower should be returned to the surface, and air excluded from the ensilage. In this instance, no cross bars and flexible members are needed, as settling is already completed. When the ensilage is being removed, and the follower is not in position there may be serious annoyance from the ensilage freezing in cold climates. If the follower is lowered to the surface and the compressible ring laid in place, this freezing will stop. From experience, I have found that it is not absolutely necessary to put in the bolts as parts 3 and 7 may be simply laid in place. This can be done after each feeding time when the ensilage is removed. This is an especially valuable feature as it requires less than five minutes daily by a single hand to arrange the parts so that freezing of the ensilage will be absolutely prevented.

It is believed that the foregoing description, when taken in connection with the drawings will fully set forth the construction and advantages of the improvement.

Having described the invention, I claim:—

1. A follower for ensilage in a silo, designed to provide an air-tight stopper for the top of the silo, comprising a body of a less cross sectional diameter than that of the silo, a ring member comprising segments secured on the body, a compressible ring member also made up of segments encircling the first mentioned ring member and in contacting engagement with the inner wall of the silo, and plates secured to the segments of the first mentioned ring member and overlying the segments of the last mentioned ring member.

2. A follower for ensilage in a silo, designed to provide an air-tight stopper for the top of the silo, comprising a body made up of strips, battens secured on the under face of the body, a segmental ring secured on the upper face of the body, a segmental compressible ring in contacting engagement with the outer periphery of the first mentioned ring and also in contacting engagement with the inner wall of the silo, means secured to the first mentioned ring and resting on the last mentioned ring for holding the same from torsional movement, said body having air openings therethrough, and stoppers for closing said openings.

3. A follower for ensilage in a silo, designed to provide an air-tight stopper for the top of the silo, comprising a body made up of strips, battens secured on the under face of the body, a segmental ring secured on the upper face of the body, a segmental compressible ring in contacting engagement with the outer periphery of the first mentioned ring and also in contacting engagement with the inner wall of the silo, means secured to the first mentioned ring and resting on the last mentioned ring for holding the same from torsional movement, flexible elements secured thereto and depending therefrom, and a bar secured to the flexible elements and designed to be surrounded by the ensilage.

In testimony whereof I affix my signature.

FRED W. BRIGHT.